US011659601B2

United States Patent
Iwai et al.

(10) Patent No.: US 11,659,601 B2
(45) Date of Patent: May 23, 2023

(54) TRANSMISSION DEVICE, RECEPTION DEVICE, TRANSMISSION METHOD, AND RECEPTION METHOD FOR RANDOM ACCESS OPERATION

(71) Applicant: Panasonic Intellectual Property Corporation of America, Torrance, CA (US)

(72) Inventors: Takashi Iwai, Ishikawa (JP); Hidetoshi Suzuki, Kanagawa (JP); Tomofumi Takata, Ishikawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 17/256,109

(22) PCT Filed: Oct. 2, 2019

(86) PCT No.: PCT/JP2019/038938
§ 371 (c)(1),
(2) Date: Dec. 24, 2020

(87) PCT Pub. No.: WO2020/137072
PCT Pub. Date: Jul. 2, 2020

(65) Prior Publication Data
US 2021/0227591 A1    Jul. 22, 2021

(30) Foreign Application Priority Data

Dec. 28, 2018 (JP) ............................ JP2018-247266

(51) Int. Cl.
*H04L 27/26* (2006.01)
*H04W 16/14* (2009.01)
*H04W 74/08* (2009.01)

(52) U.S. Cl.
CPC ..... *H04W 74/0833* (2013.01); *H04L 27/2607* (2013.01); *H04W 16/14* (2013.01)

(58) Field of Classification Search
CPC ............ H04L 27/2602; H04L 27/2607; H04L 27/2613; H04W 16/14; H04W 74/0833; H04W 74/004
See application file for complete search history.

(56) References Cited

U.S. PATENT DOCUMENTS

2010/0220666 A1    9/2010  Imamura et al.
2013/0051372 A1*   2/2013  Gutierrez .............. H04L 5/0053
                                                          370/336

(Continued)

FOREIGN PATENT DOCUMENTS

| JP | 2017-511033 A | 4/2017 |
| WO | 2007/074841 A1 | 7/2007 |
| WO | 2018/064367 A1 | 4/2018 |

OTHER PUBLICATIONS

3GPP TR 38.889 VI.1.0, "3rd Generation Partnership Project; Technical Specification Group Radio Access Network; Study on NR-based Access to Unlicensed Spectrum; (Release 16)," Dec. 2018, 119 pages.

(Continued)

*Primary Examiner* — Melvin C Marcelo
*Assistant Examiner* — Natali Pascual Peguero
(74) *Attorney, Agent, or Firm* — Seed IP Law Group LLP

(57) ABSTRACT

The present invention provides a terminal capable of suitably performing random access processing. In a terminal (100), a RACH resource determination unit (104) determines the format of a random access signal on the basis of a parameter related to the transmission of the random access signal, which includes a preamble part and a data part. A (Continued)

wireless transmission unit (109) transmits the random access signal on the basis of the format.

13 Claims, 12 Drawing Sheets

(56) References Cited

U.S. PATENT DOCUMENTS

| | | | |
|---|---|---|---|
| 2016/0366704 A1 | 12/2016 | Lee et al. | |
| 2018/0013601 A1* | 1/2018 | Wang | H04B 1/70735 |
| 2019/0132882 A1* | 5/2019 | Li | H04L 27/2605 |
| 2021/0036904 A1* | 2/2021 | Wu | H04L 5/0048 |
| 2021/0219350 A1* | 7/2021 | Wu | H04W 74/002 |

OTHER PUBLICATIONS

3GPP TS 38.211 V15.3.0, "3rd Generation Partnership Project; Technical Specification Group Radio Access Network; NR; Physical channels and modulation (Release 15)," Sep. 2018, 96 pages.
Ericsson, "Feature lead summary for UL Signals and Channels," R1-1809726, Agenda Item: 7.2.2.3.2, 3GPP TSG RAN WG1 Meeting #94, Gothenburg, Sweden, Aug. 20-24, 2018, 10 pages.
International Search Report, dated Jan. 7, 2020, for corresponding International Application No. PCT/JP2019/038938, 4 pages.
LG Electronics Inc., "Considerations on 2-Step CBRA procedure for NR-U SA," R2-1809940, Agenda Item : 11.2 (NR_newRAT-Core), 3GPP TSG-RAN WG2 #AH-1807, Montreal, Canada, Jul. 2-6, 2018, 3 pages.

\* cited by examiner

TRANSMISSION DEVICE, RECEPTION DEVICE, TRANSMISSION METHOD, AND RECEPTION METHOD FOR RANDOM ACCESS OPERATION

TECHNICAL FIELD

The present disclosure relates to a transmission apparatus, a reception apparatus, a transmission method, and a reception method.

BACKGROUND ART

In the standardization of 5G, a new radio access technology (NR) that is not necessarily backward compatible with LTE/LTE-Advanced has been discussed in 3GPP.

The operation in unlicensed bands has been discussed in NR as is the case with LTE License-Assisted Access (LTE-LAA). In LTE-LAA, the operation in unlicensed bands accompanying the operation in licensed bands has been supported. In NR, however, it is required to implement the operation in unlicensed bands without using licensed bands (Stand-alone operation).

Thus, studies have been carried out on introducing a Physical Random Access channel (PRACH), which is used for initial connection from a terminal (may be referred to as User Equipment (UE)) to a base station (may be referred to as gNB), to unlicensed bands in NR (see Non-Patent Literature 1 or 2, for example).

CITATION LIST

Non-Patent Literature

NPL 1
R2-1809940, LG Electronics Inc., "Considerations on 2-Step CBRA procedure for NR-U SA", 3GPP TSG-RAN WG2 Meeting #AH-1807
NPL 2
3GPP TR 38.889 V1.1.0, "Study on NR-based Access to Unlicensed Spectrum (Release 16)", 2018-12
NPL 3
3GPP TS 38.211 V15.3.0, "NR; Physical channels and modulation (Release 15), 2018-09"
NPL 4
R1-1809726, Ericsson, "Feature lead summary for UL Signals and Channels", 3GPP TSG-RAN WG1 Meeting #94

SUMMARY OF INVENTION

Not enough studies have been carried out, however, on a random access method in NR.

One non-limiting and exemplary embodiment facilitates providing a transmission apparatus, a reception apparatus, a transmission method, and a reception method each capable of appropriately performing random access processing.

A transmission apparatus according to an embodiment of the present disclosure includes: control circuitry, which, in operation, configures a format of a random access signal including a preamble section and a data section, based on a parameter relating to transmission of the random access signal; and transmission circuitry, which, in operation, transmits the random access signal based on the format.

It should be noted that general or specific embodiments may be implemented as a system, an apparatus, a method, an integrated circuit, a computer program, a storage medium, or any selective combination thereof.

According to an embodiment of the present disclosure, it is possible to appropriately perform random access processing.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, a detailed description will be given of embodiments of the present disclosure with reference to the accompanying drawings.

[Random Access Procedure]

A random access procedure in licensed bands is implemented, for example, in 4-step random access (may be referred to as a 4-step Random Access Channel (RACH), or 4-step Contention Based Random Access (CBRA)).

Figure 1:
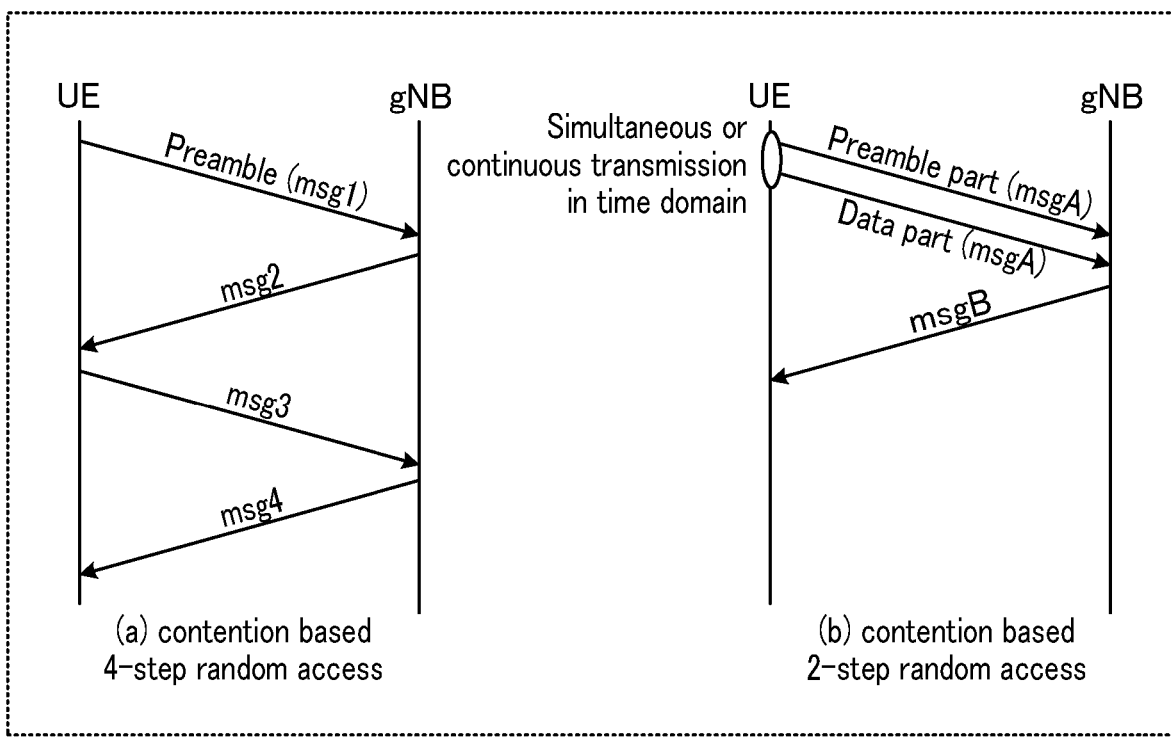
FIG. 1 illustrates an exemplary random access procedure.

In the 4-step random access, a terminal (UE) transmits a Preamble to a base station (gNB) as the first transmission (msg 1), for example, as illustrated in (a) of FIG. 1. After receiving and decoding msg 1, the base station indicates a response to the Preamble (RA response), scheduling information including the uplink transmission timing of msg 3, and the like, to the terminal as the second transmission (msg 2). After receiving and decoding msg 2, the terminal indicates Radio Resource Control (RRC) connection request information, such as information on the terminal (e.g., a terminal ID), using the scheduling information indicated by msg 2, to the base station as the third transmission (msg 3). Lastly, the base station indicates control information for RRC connection of the terminal or control information for Contention resolution, for example, to the terminal as the fourth transmission (msg 4). The control information for Contention resolution includes, for example, a control signal indicated from the terminal. In the Contention resolution, the terminal compares the control signal transmitted from the terminal with the control information for Contention resolution included in msg 4. When the control signal and the control information are not the same information, the terminal restarts from msg 1 in order to avoid RACH collision of a plurality of terminals, for example.

Meanwhile, studies have been carried out on introducing 2-step random access (may be referred to as a 2-step RACH or 2-step CBRA) as a random access procedure in unlicensed bands in NR (see, for example, NPL 1 and NPL 2).

In the 2-step random access, a terminal transmits a Preamble part, which corresponds to the Preamble (or msg 1) in (a) of FIG. 1, and a Data part, which corresponds to msg 3 in (a) of FIG. 1, to a base station as the first transmission (msg 1), for example, as illustrated in (b) of FIG. 1. The terminal may transmit the Preamble part and the Data part simultaneously, continuously, or within a specified time (e.g., within one slot).

Next, after receiving and decoding msg 1, the base station indicates control information for uplink transmission timing and RRC connection of the terminal or control information for Contention resolution, which corresponds to msg 2 and msg 4 in (a) of FIG. 1, for example, to the terminal as the second transmission (msg 2), as illustrated in (b) of FIG. 1.

The introduction of the 2-step random access to unlicensed bands in NR is expected to bring effects of reducing Listen Before Talk (LBT) processing or reducing a delay time of random access, for example.

Note that the introduction of the 2-step random access is not limited to the unlicensed bands. For example, studies have been carried out on reducing a delay time of data transmission and data reception by diverting the 2-step random access to licensed bands and applying it to services for Ultra-Reliable and Low Latency Communications (URLLC).

[Slot Format]

Figure 2:
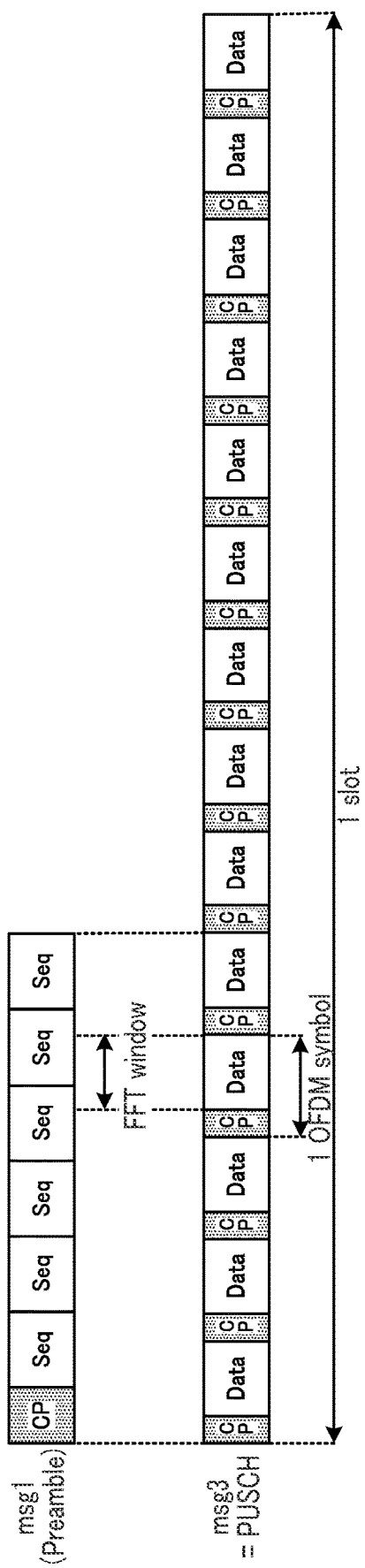
FIG. 2 illustrates exemplary Slot formats of msg 1 and msg 3.

FIG. 2 illustrates an exemplary Slot format (referred to as short preamble format A3, for example) of msg 1 (e.g., Preamble), and an exemplary Slot format of msg 3 in the 4-step random access (see, for example, NPL 3).

As illustrated in FIG. 2, msg 1 is configured by repeating a plurality of sequences, each of which is illustrated as "Seq." in FIG. 2, and adding a Cyclic Prefix (CP) to the head.

Further, msg 3 may use the same slot format as that of a usual uplink data channel (e.g., a Physical Uplink Shared Channel (PUSCH)). For example, msg 3 is configured by generating 14 Orthogonal Frequency Division Multiplexing (OFDM) symbols, each of which is configured by adding a CP to data, in a slot, as illustrated in FIG. 2. Each of the plurality of OFDM symbols of msg 3 may include different data, for example.

Msg 1 (e.g. Preamble) is, for example, configured by repeating a sequence with the sequence length shorter than the size of an FFT window of the OFDM symbol, as illustrated in FIG. 2. In other words, msg 1 is configured with a plurality of same sequences, for example. Thus, the signal continuity is secured at both ends of the FFT window even when a Preamble and a PUSCH of another terminal are frequency-multiplexed, thereby preventing interference from the Preamble to the PUSCH (Inter-carrier interference (ICI)).

A configuration of a slot format in the 2-step random access, however, has not been fully discussed.

For example, studies have been carried out on a slot format that transmits a Message part (also referred to as a Data part) after a Preamble part in the 2-step random access for licensed bands (see NPL 4, for example). Transmitting the Preamble part prior to the Message part brings an effect of reducing the demodulation time of msg A as a whole when the Preamble part is used for a reference signal for demodulating the data of the Message part (e.g., a Demodulation Reference Signal (DMRS)).

Figure 3:
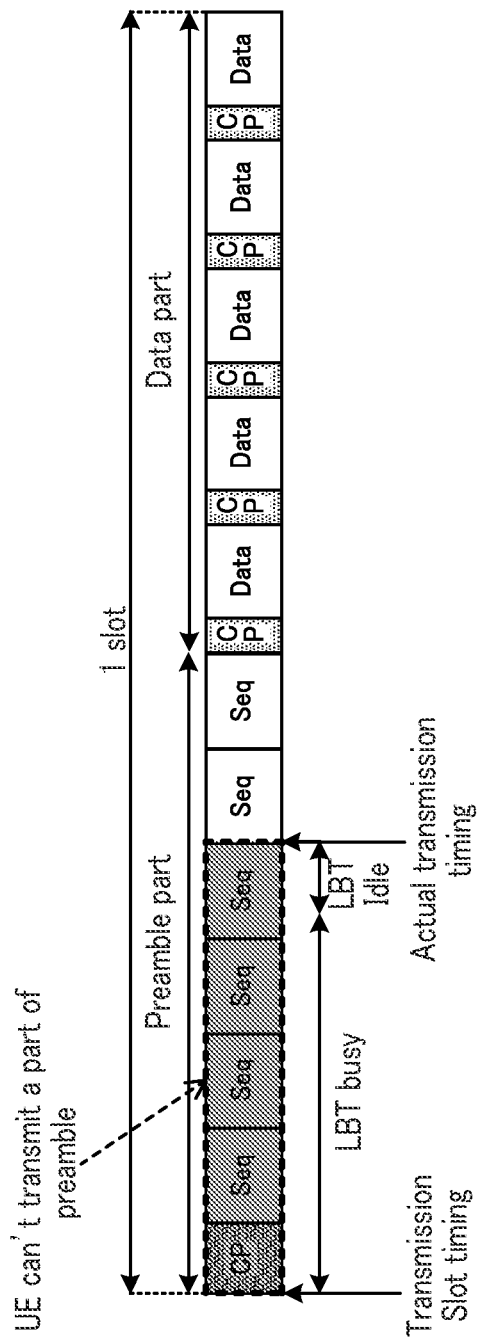
FIG. 3 illustrates an exemplary Slot format in 2-step random access.

Meanwhile, in unlicensed bands, an LBT result before transmission may be Busy (i.e., Failure) in some cases, and a terminal cannot transmit a head part of msg A. FIG. 3 illustrates an exemplary Slot format of msg A to be configured in the order of a Preamble part and a Data part. Note that the transmission timing (the transmission slot timing) of msg A is fixed, for example, in FIG. 3. The LBT result is Busy (Failure) in msg A illustrated in FIG. 3, for example, and the terminal cannot transmit a part of the Preamble part in that case.

When the Preamble part is used for DMRS of the Data part, for example, the transmission failure of a part of the Preamble part as illustrated in FIG. 3 may cause a possibility that a base station cannot decode a signal of the Data part.

In addition, decoding results of the Preamble part and decoding methods for the Data part such as a Modulation and Coding Scheme (MCS) are associated with each other in some cases. In such a case, the transmission failure of a part of the Preamble part as illustrated in FIG. 3 may also cause the possibility that the base station cannot decode the Data part.

Thus, descriptions will be given of Slot formats of 2-step random access capable of reducing an influence of an LBT result on a performance in an embodiment of the present disclosure Note that the "2-step random access" in the following description means a random access procedure where a Preamble part, which corresponds to msg 1 of the 4-step random access, and a Data part, which corresponds to msg 3 of the 4-step random access, are transmitted simultaneously, transmitted in consecutive radio resources, or transmitted in radio resources within a predetermined time (e.g., within a slot). In other words, the 2-step random access means a random access procedure where the Data part is transmitted with the Preamble part. Alternatively, the 2-step random access means a random access procedure where the terminal transmits the Data part before receiving a response to the Preamble, which corresponds to msg 2 of the 4-step random access, or the terminal transmits the Data part without waiting for a response to the Preamble.

Embodiment 1

[Overview of Communication System]

A communication system according to an embodiment of the present disclosure includes terminal 100 and base station 200. In the following description, terminal 100, which corresponds to a transmission apparatus, transmits PRACH (also referred to as a random access signal), and base station 200, which corresponds to a reception apparatus, receives the PRACH, as an example.

Figure 4:
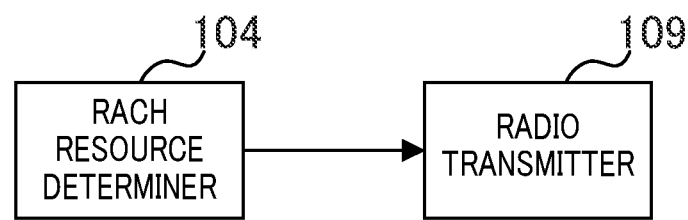
FIG. 4 is a block diagram illustrating a configuration of a part of a terminal according to Embodiment 1.

FIG. 4 is a block diagram illustrating a configuration of a part of terminal 100 according to the embodiment of the present disclosure. In terminal 100 illustrated in FIG. 4, RACH resource determiner 104 (corresponding to control circuitry, for example) determines a format (e.g., a Slot format) of a random access signal including a preamble section (e.g., a Preamble part) and a data section (e.g., a Data part) based on a parameter relating to transmission of the random access signal. Radio transmitter 109 (corresponding to transmission circuitry, for example) transmits the random access signal based on the format.

Figure 5:
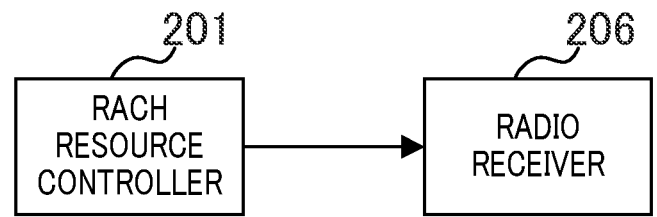
FIG. 5 is a block diagram illustrating a configuration of a part of a base station according to Embodiment 1.

FIG. 5 is a block diagram illustrating a configuration of a part of base station 200 according to the embodiment of the present disclosure. In base station 200 illustrated in FIG. 5, RACH resource controller 201 (corresponding to control circuitry, for example) determines a format of a random access signal based on a parameter relating to transmission of the random access signal. Radio receiver 206 (corresponding to reception circuitry, for example) receives the random access signal based on the format.

[Configuration of Terminal]

Figure 6:
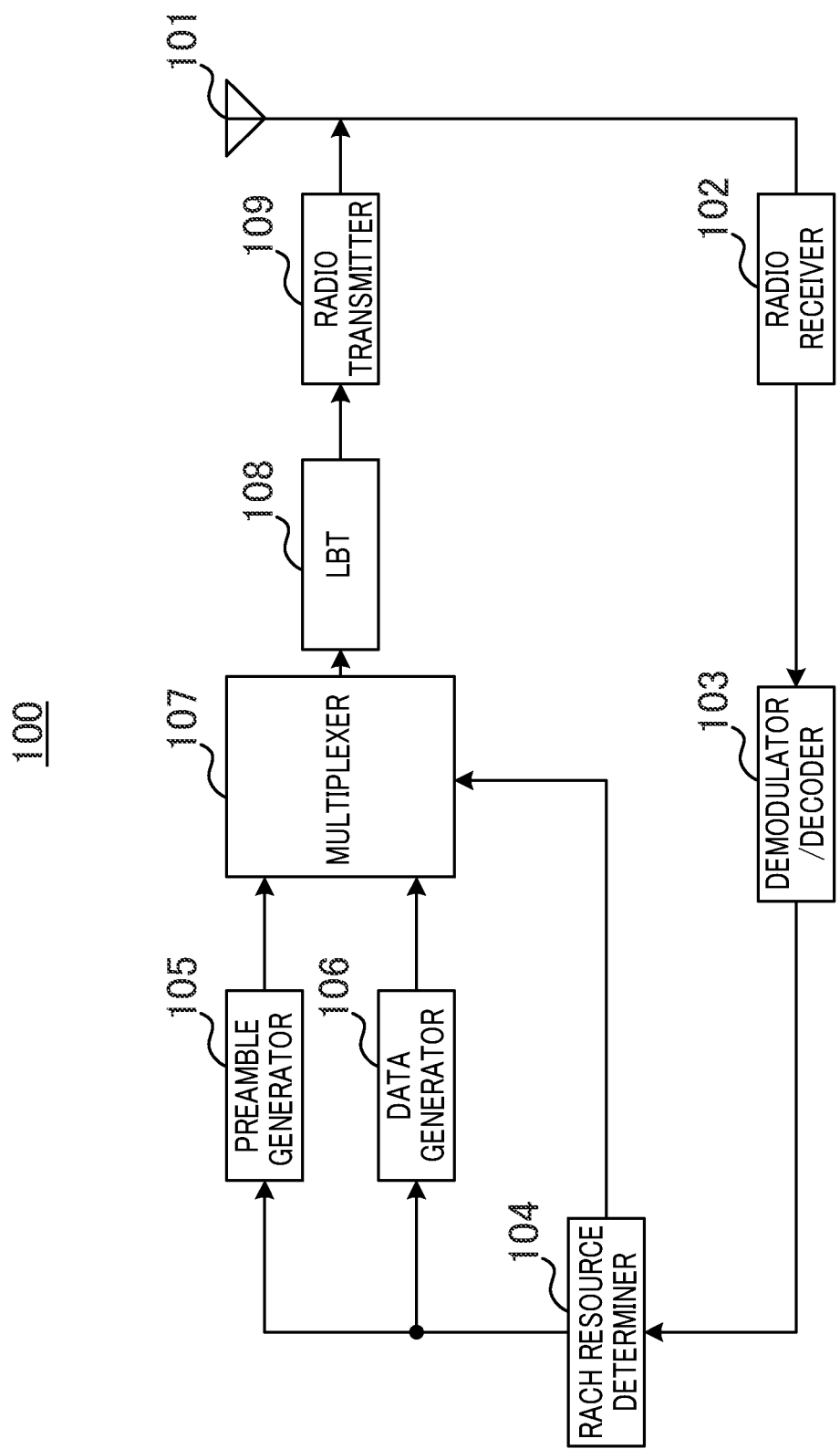
FIG. 6 is a block diagram illustrating a configuration of the terminal according to Embodiment 1.

FIG. 6 is a block diagram illustrating a configuration of terminal 100 according to the present embodiment.

In FIG. 6, terminal 100 includes antenna 101, radio receiver 102, demodulator/decoder 103, RACH resource determiner 104, Preamble generator 105, Data generator 106, multiplexer 107, LBT 108, and radio transmitter 109.

Radio receiver 102 performs reception processing such as down-conversion and A/D conversion to the signal transmitted from base station 200 via antenna 101, and outputs a received signal obtained by the reception processing to demodulator/decoder 103.

The signal to be transmitted from base station 200 includes, for example, control information including radio resource information to be used by terminal 100 for the 2-step random access transmission, a response data signal to PRACH (e.g., msg B illustrated in (b) of FIG. 1), or the like. Further, the radio resource information includes, for example, RACH resource information such as sequence information for a Preamble part, frequency allocation information for the Preamble part, MCS information for a Data part, frequency allocation information for the Data part, and Slot format information.

Demodulator/decoder 103 demodulates and decodes the received signal to be inputted from radio receiver 102. For example, demodulator/decoder 103 demodulates and decodes higher layer signaling (also referred to as RRC signaling or a higher layer parameter, for example), downlink control information (DCI), or the like, and outputs RACH resource information in the decoded signal to RACH resource determiner 104.

In addition, RRC connection processing by the 2-step random access is completed when demodulator/decoder 103 appropriately receives the response data signal to PRACH.

RACH resource determiner 104 outputs the resource information for the Preamble part to Preamble generator 105, and outputs the resource information for the Data part to Data generator 106, for example, based on the RACH resource information to be inputted from demodulator/decoder 103. Additionally, RACH resource determiner 104 configures a Slot format for the 2-step random access (e.g., a format of msg A), and outputs the configuration information of the Slot format to multiplexer 107.

Preamble generator 105 generates a Preamble based on the resource information to be inputted from RACH resource determiner 104. For example, Preamble generator 105 randomly selects a single Preamble number from a Preamble number group, and generates a CS-ZC sequence using the sequence number and the Cyclic shift (CS) value corresponding to the selected Preamble number. Preamble generator 105 assigns the generated CS-ZC sequence to the frequency resource to be indicated in the resource information, for example. Further, Preamble generator 105 performs Inverse Fast Fourier Transform (IFFT) processing on the CS-ZC sequence, for example, and converts the sequence into a time domain signal. Preamble generator 105 repeats the CS-ZC sequence, which is the time domain signal, for the predetermined number of symbols, and adds a CP length of any time length. Preamble generator then outputs the generated signal (e.g., a Short preamble format signal; a signal with a similar format to that of the Preamble illustrated in FIG. 2) to multiplexer 107 as a Preamble part signal.

Note that the sequence to be used for the Preamble part signal is not limited to the ZC sequence, and may be any sequence having a proper correlation characteristic. The Preamble part signal is also not limited to be generated by repeating a sequence of a short sequence length. The Preamble part signal may be generated by adding a CP to a sequence of a long sequence length corresponding to a time length of the Preamble part when, for example, the signal is not frequency-multiplexed with uplink channels (e.g., PUSCH) other than PRACH, or the interference can be reduced by providing a guard band.

Further, when the Preamble number for the Preamble part is indicated from base station 200 to terminal 100 by downlink control information (e.g., DCI), Preamble generator 105 only needs to generate the CS-ZC sequence using the sequence number and the cyclic shift value corresponding to the indicated Preamble number.

Data generator 106, for example, generates a data signal (corresponding to msg 3 in the 4-step random access, for example) including RRC connection request information (or information to be used for the Connection establishment) and the like, such as a terminal ID. Data generator 106 encodes and modulates (e.g., QPSK or 16QAM) the generated data signal based on the resource information to be inputted from RACH resource determiner 104, for example. Data generator 106 also generates an OFDM symbol by assigning the modulated signal (a data sequence) to the frequency resource based on the resource information, performing OFDM modulation (e.g., IFFT processing), and adding a CP. Data generator 106 then outputs a signal to be configured by arranging the generated OFDM symbol for the predetermined number of symbols in the time domain, to multiplexer 107 as a Data part signal. Note that the Data part signal may include a reference signal for data demodulation (e.g., DMRS) for improving the channel estimation accuracy, for example.

Multiplexer 107 time-multiplexes the Preamble part signal to be inputted from Preamble generator 105 and the Data part signal to be inputted from Data generator 106, based on the Slot format configuration information of the 2-step random access to be inputted from RACH resource determiner 104, and outputs the multiplexed signal to LBT 108 as a msg A signal of the 2-step random access.

LBT 108 performs LBT processing when, for example, the transmission of the msg A signal to be inputted from multiplexer 107 is the transmission in unlicensed bands. When the LBT result immediately before the transmission timing of the Slot is Busy (Failure), for example, LBT 108 further continues carrier sensing for the predetermined time length. Meanwhile, when the LBT result becomes Idle (OK), for example, LBT 108 outputs the msg A signal to radio transmitter 109 from the timing when the LBT result becomes Idle. In other words, LBT 108 outputs the signal obtained by subtracting the msg A signal for the time when the LBT result is Busy (i.e., the head part of the msg A signal) from the start timing of the Slot transmission, to radio transmitter 109.

Note that the LBT processing in LBT 108 is unnecessary, for example, in licensed bands.

Radio transmitter 109 performs transmission processing such as D/A conversion, up-conversion, and amplification on the signal to be inputted from LBT 108, and transmits a radio signal obtained by the transmission processing (e.g., the msg A signal in the 2-step random access) to base station 200 via antenna 101.

[Configuration of Base Station]

Figure 7:
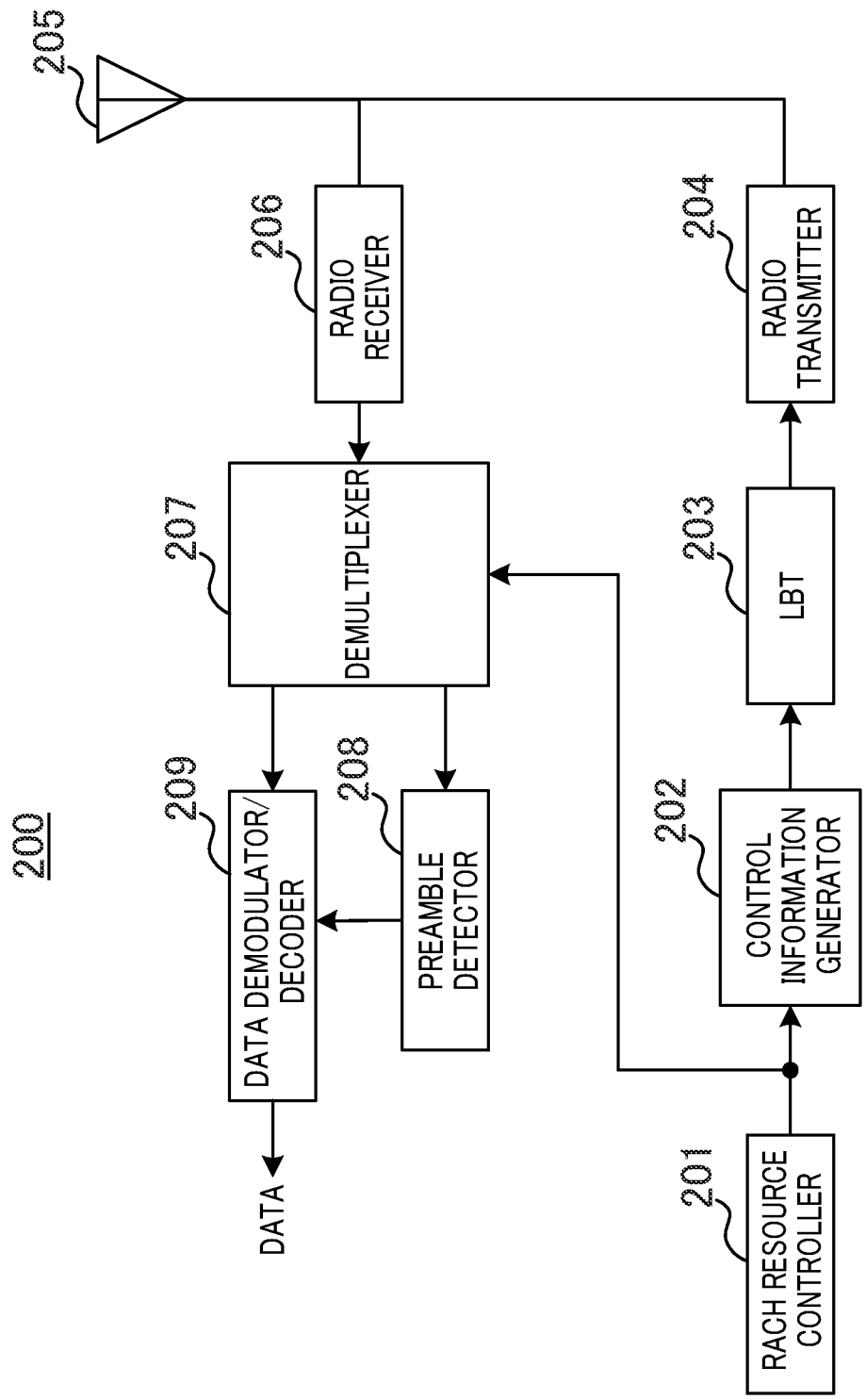
FIG. 7 is a block diagram illustrating a configuration of the base station according to Embodiment 1.

FIG. 7 is a block diagram illustrating a configuration of base station 200 according to the present embodiment.

In FIG. 7, base station 200 includes RACH resource controller 201, control information generator 202, LBT 203, radio transmitter 204, antenna 205, radio receiver 206, demultiplexer 207, Preamble detector 208, and Data demodulator/decoder 209.

RACH resource controller 201, for example, controls RACH resources available in a cell of base station 200, and outputs RACH resource information indicating the determined RACH resource to control information generator 202 and demultiplexer 207. RACH resource controller 201 configures a Slot format for the 2-step random access (e.g., a format of msg A), for example.

The RACH resource information includes, for example, radio resource information to be used for the transmission of the 2-step random access in terminal 100, such as sequence information for a Preamble part, frequency allocation information for the Preamble part, MCS information for a Data part, frequency allocation information for the Data part, and Slot format information.

Control information generator 202 generates control information including the RACH resource information to be inputted from RACH resource controller 201. Control information generator 202 outputs a signal including the generated control information to LBT 203, for example.

Note that the control information may be included in, for example, higher layer signaling or downlink control information (DCI). The higher layer signaling may include, for example, RACH-Configuration in NR (e.g., RACH-Config-Common and RACH-ConfigDedicated). In addition, the downlink control information may include, for example, DCI format 1_0 in NR.

Further, all the control information need not be simultaneously indicated to terminal 100. For example, a part of the control information may be indicated to terminal 100 as cell common information, quasi-static indication information, or dynamic indication information (e.g., DCI). In addition, a part of the control information may be specified as system common information, and does not have to be indicated from base station 200 to terminal 100, for example.

LBT 203 performs LBT processing when the transmission of the control information to be inputted from control information generator 202 is the transmission in unlicensed bands. When the LBT result becomes Idle (OK), for example, LBT 203 outputs the control information to radio transmitter 204 from the timing when the LBT result becomes Idle. Note that the LBT processing in LBT 203 is unnecessary in licensed bands.

Radio transmitter 204 performs transmission processing such as D/A conversion, up-conversion, and amplification on the signal to be inputted from LBT 203, and transmits a radio signal obtained by the transmission processing to terminal 100 via antenna 205.

Radio receiver 206 performs reception processing such as down-conversion and A/D conversion to the RACH signal received from terminal 100 via antenna 205 (e.g., msg A in the 2-step random access), for example, in the RACH transmission resource indicated to terminals 100 in the cell of base station 200. Radio receiver 206 outputs a signal obtained by the reception processing to demultiplexer 207.

Demultiplexer 207 demultiplexes a Preamble part signal and a Data part signal from the msg A signal to be transmitted from radio receiver 206, for example, based on the RACH resource information (e.g., time resource information, frequency resource information, or Slot format information), which has been indicated to terminals 100 in the cell, to be inputted from RACH resource controller 201. Demultiplexer 207 outputs the Preamble part signal to Preamble detector 208, and the Data part signal to Data demodulator/decoder 209.

Preamble detector 208 generates a replica signal for detecting the Preamble part signal using the sequence number and the CS number corresponding to each Preamble number of a Preamble group available in the cell of base station 200. Preamble detector 208 performs correlation processing between the generated replica signal and the Preamble part signal to be inputted from demultiplexer 207, detects the Preamble number, and estimates the transmission timing. Preamble detector 208 outputs the correlation result (i.e., a channel estimate) to Data demodulator/decoder 209. Preamble detector 208 may also output the detection result (e.g., the Preamble number) to Data demodulator/decoder 209.

Data demodulator/decoder 209 performs demodulation and decoding on the Data part signal to be inputted from demultiplexer 207 using the channel estimate to be inputted from Preamble detector 208, and outputs the decoding result (received data). Note that, when the Preamble numbers and MCSs for Data demodulation are associated with each other, Data demodulator/decoder 209 selects the MCS according to the Preamble number to be inputted from Preamble detector 208, and performs demodulation and decoding on the Data part signal based on the selected MCS.

[Operations of Terminal 100 and Base Station 200]

Operation examples of terminal 100 and base station 200 including the above-described configurations will be described.

Figure 8:
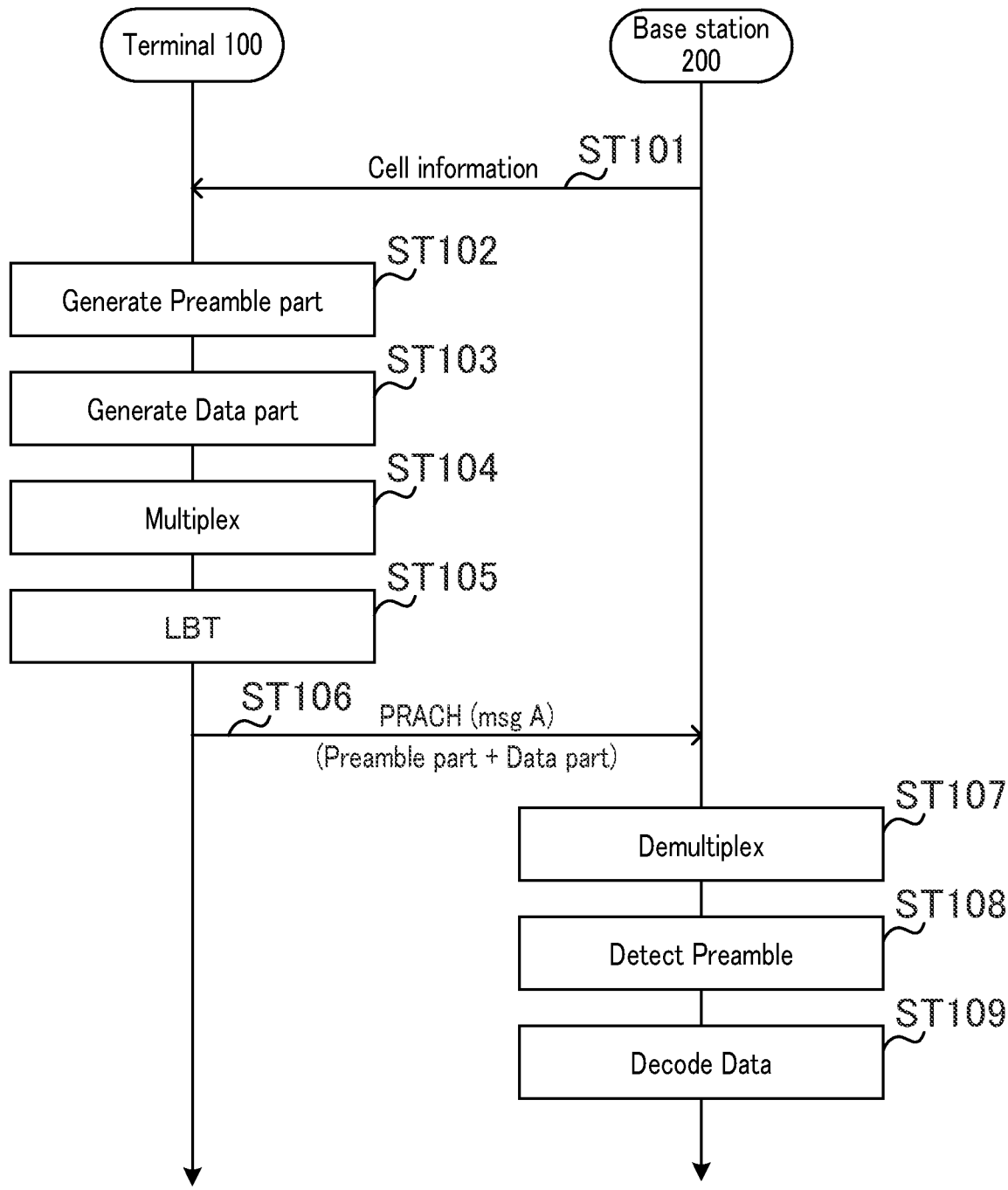
FIG. 8 is a sequence diagram illustrating exemplary operations of the terminal and the base station according to Embodiment 1.

FIG. 8 is a sequence diagram illustrating exemplary operations of terminal 100 (FIG. 6) and base station 200 (FIG. 7).

In FIG. 8, base station 200, for example, indicates (i.e., broadcasts) cell information including RACH resource information to be used by terminal 100 for the 2-step random access transmission, to terminal 100 (ST101). For example, higher layer signaling or downlink control information (DCI) may be used for the indication of the RACH resource information.

Terminal 100, for example, generates a Preamble part signal to be included in a msg A signal (ST102), and generates a Data part signal to be included in a msg A signal (ST 103), based on the RACH resource information to be indicated in the cell information.

Terminal 100 generates the msg A signal by time-multiplexing the generated Preamble part signal and Data part signal, based on the Slot format information (e.g., a Slot format of msg A) to be indicated in the RACH resource information (ST104).

Terminal 100 also performs LBT (ST105). Terminal 100 transmits the msg A signal (a PRACH signal) to base station 200 at the timing when the LBT result becomes Idle (OK)

(ST106). The msg A signal includes, for example, a signal obtained by subtracting the signal for the time length that the LBT result is Failure from the head of the Slot.

Base station 200 demultiplexes the Preamble part signal and the Data part signal from the msg A signal based on the RACH resource information (e.g., the Slot format of msg A) indicated to terminal 100 (ST107). Base station 200 calculates a channel estimate using the Preamble part signal, and detects a Preamble number (ST108). Base station 200 then demodulates and decodes the Data part signal using the channel estimate (or the Preamble number) (ST109).

[Configuration Method for Slot Format in 2-Step Random Access]

Next, exemplary configuration methods for a Slot format in 2-step random access will be described.

Figure 9:
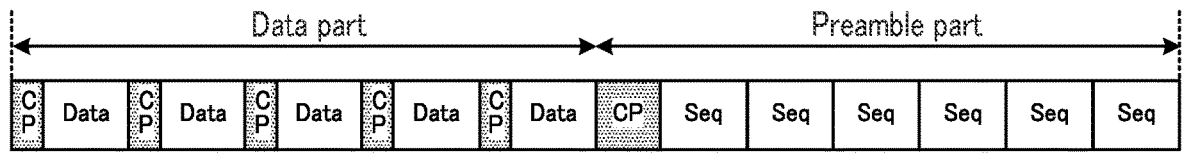
FIG. 9 illustrates an exemplary Slot format according to Embodiment 1.
Figure 10:
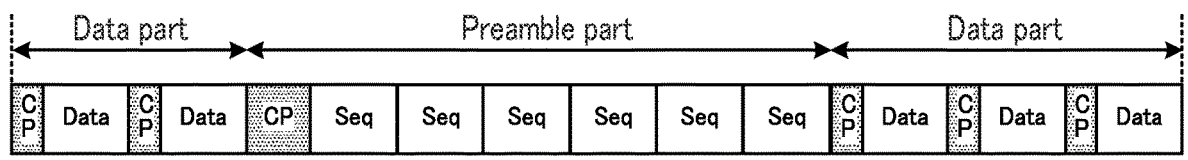
FIG. 10 illustrates another exemplary Slot format according to Embodiment 1.

For example, the Slot format for the 2-step random access is a format in which at least a part of a Data part (a data section) is mapped to a position forward of a Preamble part (a preamble section), as illustrated in FIGS. 9 and 10. In other words, terminal 100 and base station 200 configure the Slot format to be a configuration in which all or a part of the Data part is transmitted prior to the transmission of the Preamble part signal, for example.

The Slot format illustrated in FIG. 9, for example, is configured to transmit all of the Data part signal prior to the transmission of the Preamble part signal. In other words, in the Slot format illustrated in FIG. 9, the Preamble part signal is transmitted after the Data part signal.

Further, in the Slot format illustrated in FIG. 10, for example, a part of the Data part signal is transmitted prior to the transmission of the Preamble part signal, and the remaining Data part signal is transmitted after the Preamble part signal.

The configuration of the Slot format illustrated in FIG. 9 or 10 increases the probability that terminal 100 can transmit all of the Preamble part signal even when, for example, the LBT result is Busy and the head part of msg A cannot be transmitted in terminal 100. In other words, the configuration increases the probability that a part of the Data part signal is not transmitted when the LBT result is Busy and terminal 100 cannot transmit the head part of msg A.

Base station 200 may be able to decode the Data part signal when base station 200 properly receives the Preamble part signal to be transmitted from terminal 100. The Slot format illustrated in FIG. 9 or 10 increases the probability that base station 200 can properly receive the Preamble part signal, thereby increasing the possibility of decoding the Data part signal.

In addition, even when base station 200 cannot decode the Data part signal with the Slot format illustrated in FIG. 9 or 10, base station 200 can request re-transmission of the Data part signal, that is, base station 200 can shift (i.e., fallback) to 4-step random access, and this eliminates the need for re-transmission of the Preamble part signal.

As described above, according to the present embodiment, terminal 100 determines the Slot format illustrated in FIG. 9 or 10, for example, and transmits msg A (i.e., random access signals) based on the determined Slot format. Meanwhile, base station 200 determines the Slot format illustrated in FIG. 9 or 10, for example, and receives msg A (i.e., the random access signals) based on the determined Slot format.

The configurations of the Slot formats illustrated in FIGS. 9 and 10, for example, reduce the influence of non-transmission of a part of the msg A signals due to the LBT result on the random access performance. Thus, terminal 100 and base station 200 can appropriately perform the random access processing according to the present embodiment.

Further, transmitting all of the Data part signal prior to the Preamble part signal, as illustrated in FIG. 9, further reduces the possibility that the Preamble part signal is not transmitted due to the LBT result, compared to the case of FIG. 10. Therefore, the influence on the random access performance can be further reduced in FIG. 9.

Meanwhile, transmitting a part of the Data part signal prior to the Preamble part signal, as illustrated in FIG. 10, enables base station 200, for example, to receive the Preamble part signal to be used as DMRS earlier, thereby reducing the decoding time of msg A.

Note that the Slot formats illustrated in FIGS. 9 and 10 are examples, and the Slot format is not limited thereto. For example, the relationship between the number of symbols of the Data part mapped before the Preamble part and the number of symbols of the Data part mapped after the Preamble part is not limited to the example illustrated in FIG. 10.

Additionally, the Slot format of the above-described RACH signal (e.g., msg A) may be determined based on a parameter relating to the RACH signal. Hereinafter, variations of the present embodiment will be described.

Variation 1 of Embodiment 1

The Slot format described in the present embodiment is not limited to be used in the case where the unlicensed band is used for the transmission of the RACH signal, and may also be used in the licensed band. For example, sharing the Slot format between the licensed band and the unlicensed band enables to simplify the transmission and reception processing of the random access in terminal 100 and base station 200.

Variation 2 of Embodiment 1

The Slot format described in the present embodiment (e.g., FIG. 9 or 10) may be applied when the transmission of the RACH signal meets a particular communication condition.

For example, the Slot format illustrated in FIG. 9 or 10 may be applied in the unlicensed band in which the LBT processing is performed, and may not be applied in a band other than the unlicensed band (e.g., the licensed band). This leads to the situation where all or a part of the Data part signal is transmitted prior to the Preamble part signal in transmitting msg A in the unlicensed band, for example.

Figure 11:
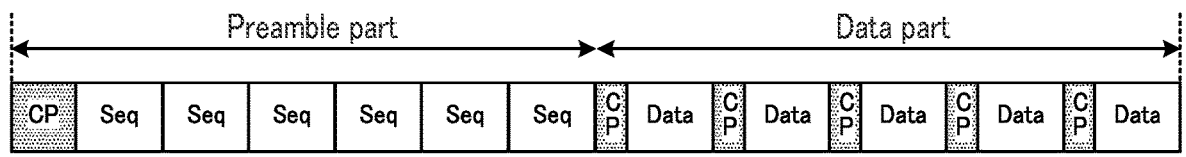
FIG. 11 illustrates still another exemplary Slot format according to Embodiment 1.

Meanwhile, in the licensed band, for example, the LBT processing is not performed, and thus the Slot format for the 2-step random access may be configured to transmit the Preamble part signal and the Data part signal in this order as illustrated in FIG. 11. This reduces the decoding time of msg A in the licensed band.

Variation 3 of Embodiment 1

The Slot format for the 2-step random access (i.e., the transmission order of the Preamble part signal and the Data part signal) may be configured (i.e., may be switched) in units of cells.

For example, the LBT result is likely to be Busy in a cell existing in an environment where cells are densely deployed. In this regard, the Slot format illustrated in FIG. 9, which can further reduce the influence of the LBT result on the random access performance, may be applied, for example, in a cell existing in the environment where cells are densely deployed.

In a cell existing in an environment different from the environment where cells are densely deployed (e.g., an environment where cells are dotted), in contrast, the Slot format illustrated in FIG. 10 or 11 may be applied in order to reduce the decoding time, for example.

Variation 4 of Embodiment 1

Terminal 100 and base station 200 may control the application of the Slot format according to the category of LBT (i.e., carrier sensing).

For example, Category 1 of LBT is where signals can be transmitted without carrier sensing, and Category 2 of LBT is where signals can be transmitted when the result of carrier sensing for a predetermined time period (e.g., 25 μs) is Idle (OK). The LBT in Category 1 or Category 2 is suitable when terminal 100 transmits msg A at a particular Slot timing because signals can be transmitted with short-time carrier sensing.

Meanwhile, Category 3 or Category 4 of LBT is where signals can be transmitted when the result of carrier sensing in a particular back-off time is Idle (OK). The LBT in Category 3 or Category 4 has difficulty in adjusting the transmission to a particular Slot timing, and msg A is transmitted at a Slot timing (e.g., a RACH resource) after the LBT result becomes Idle (OK). Thus, Category 3 or Category 4 does not cause a problem that a head part of msg A is not transmitted due to the LBT result, although the delay is increased.

In this regard, terminal 100 and base station 200 may determine to apply the Slot format illustrated in FIG. 9 or 10, for example, in the case of using the LBT in Category 1 or Category 2. In other words, terminal 100 and base station 200 may determine not to apply the Slot format illustrated in FIG. 9 or 10, for example, in the case of using the LBT in Category 3 or Category 4. Terminal 100 and base station 200 may determine to apply the Slot format illustrated in FIG. 11, for example, in the case of using the LBT in Category 3 or Category 4.

Note that the category of LBT to be used by terminal 100 is specified according to, for example, the condition of Channel occupancy time (COT) or the type of channels. Thus, terminal 100 can recognize the category of LBT to use.

Variation 5 of Embodiment 1

Terminal 100 and base station 200 may control the application of the Slot format according to a type of RACH (referred to as a RACH type, for example) indicating the type of the random access transmission.

The RACH type includes two types, for example, which are Contention Based Random Access (CBRA) and Contention Free Random Access (CFRA). The CBRA is a RACH to be transmitted at the initiative of a terminal, and the terminal determines the Slot timing of msg A. The CFRA, in contrast, is a RACH to be transmitted at the initiative of a base station (e.g., an indication or a trigger by a downlink control channel), and the transmission of msg A of each terminal is scheduled so as not to cause collisions among a plurality of terminals.

Terminal 100 transmits msg A at a particular timing in CFRA, for example, and it is highly possible to present a problem that a head part of msg A is not transmitted. In this regard, terminal 100 and base station 200 may determine to apply the Slot format illustrated in FIG. 9 or 10, for example, when the RACH type is CFRA. Further, terminal 100 and base station 200 may determine to apply the Slot format illustrated in FIG. 11 when the RACH type is CBRA, for example.

Embodiment 2

A terminal according to the present embodiment has the same basic configuration as that of terminal 100 according to Embodiment 1, and thus FIG. 6 will be used for the description.

Figure 12:
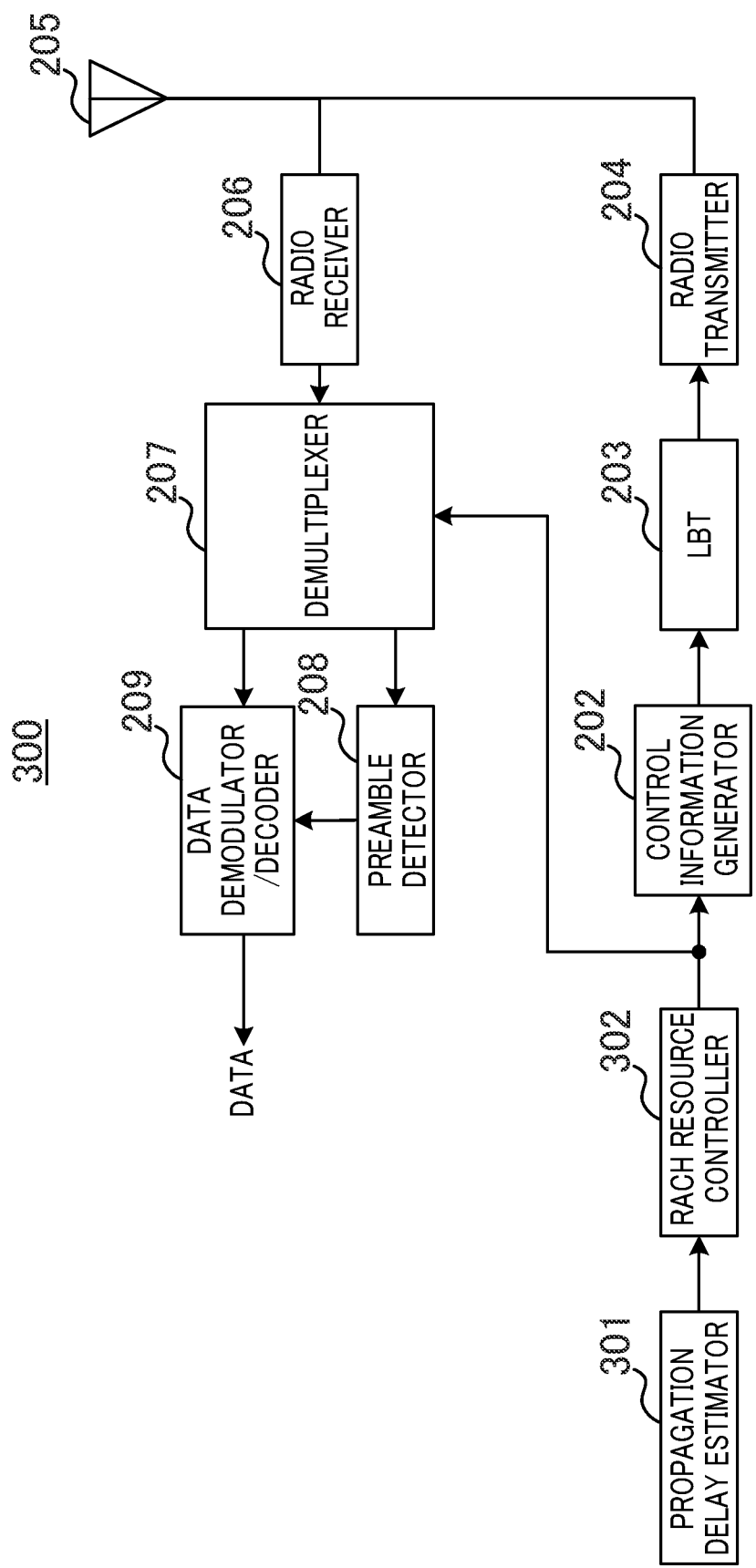
FIG. 12 is a block diagram illustrating a configuration of a base station according to Embodiment 2.

FIG. 12 is a block diagram illustrating an exemplary configuration of base station 300 according to the present embodiment. Note that the same configurations as those in Embodiment 1 (see FIG. 7) are denoted by the same reference signs in FIG. 12, and the descriptions thereof are omitted. The difference between the configurations of base station 300 illustrated in FIG. 12 and base station 200 illustrated in FIG. 7, for example, is that propagation delay estimator 301 is added to base station 300.

In base station 300, propagation delay estimator 301 estimates an expected propagation delay time (e.g., a maximum propagation delay time) between base station 300 and terminal 100, based on the assumed coverage area of base station 300, for example. Propagation delay estimator 301 outputs the estimation result to RACH resource controller 302.

RACH resource controller 302 determines the CP length of the Preamble part, for example, according to the estimation result of the propagation delay time to be inputted from propagation delay estimator 301. For example, RACH resource controller 302 configures the CP length equal to or longer than the maximum propagation delay time in order to reduce the Inter-symbol interference (ISI) caused by delay waves. RACH resource controller 302 then controls the Slot format configuration of the Data part based on the estimation result of the maximum propagation delay time or the CP length of the Preamble part.

For example, RACH resource controller 302 controls the Slot format configuration of the Data part based on the maximum propagation delay time or a comparison result of the CP length of the Preamble part with a threshold. When the maximum propagation delay time is represented by the CP length of the Preamble part, for example, the CP length of another uplink channel may be configured as the threshold, examples of which will be described later.

[Configuration Methods for Slot Format of Data Part for 2-Step Random Access]

Next, descriptions will be given of exemplary configuration methods for the Slot format of the Data part for the 2-step random access according to the present embodiment.

[Transmission Control of Data Part]

A RACH signal (e.g., a msg A signal) is transmitted even prior to initial synchronization, that is, prior to transmission timing control. Thus, the CP length of the Preamble part is configured in each cell, for example, considering the maximum propagation delay time expected from the distance between base station 300 and terminal 100 in order to reduce the interference.

For the CP lengths of uplink channels other than RACH (e.g., PUSCH), in contrast, a time length defined in accordance with Sub-Carrier Spacing (SCS) is configured, for example. In addition, those uplink channels may also be transmitted with the transmission timing controlled. Thus, the CP lengths of those uplink channels are configured with the maximum delay amount of the delay waves taken into account, for example, without depending on the distance between base station 300 and terminal 100. For example, the CP length of those uplink channels may be defined in the system.

Herein, when msg A and PUSCH are frequency-multiplexed, for example, it needs to be considered preventing the interference (Inter-carrier interference (ICI)) between the Data part in msg A and other uplink channels (e.g., PUSCH), as with the Preamble part.

Figure 13:
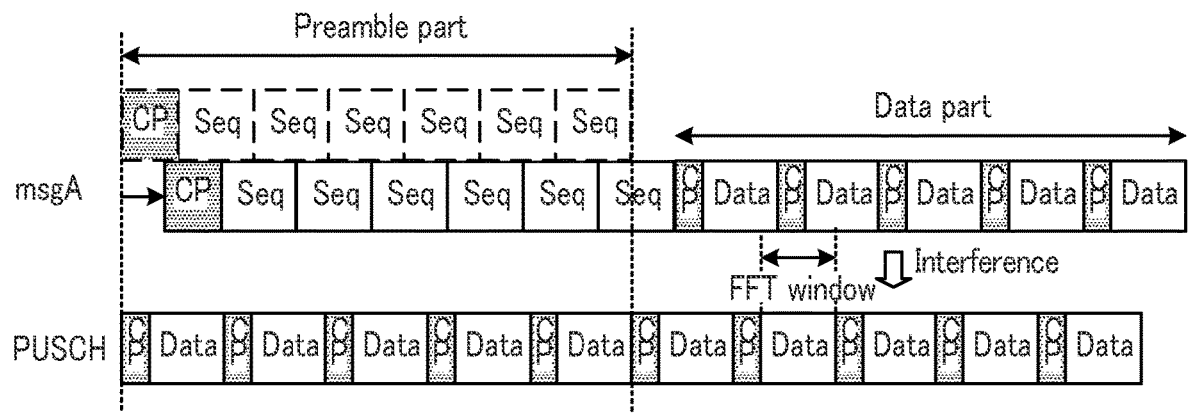
FIG. 13 illustrates an exemplary Slot format according to Embodiment 2.

For example, when the CP length (the propagation delay length) of the Preamble part exceeds the CP length of PUSCH as illustrated in FIG. 13, the continuity of signals is not secured in the Data part at both ends of the FFT window of PUSCH. Thus, the Data part signals of different OFDM symbols are mingled in the FFT window of PUSCH as illustrated in FIG. 13, thereby collapsing the orthogonality of OFDM and causing ICI from RACH (e.g., the Data part signal of msg A) to PUSCH.

In this regard, RACH resource controller 302 indicates the transmission stop (i.e., configures the non-transmission) of the Data part signal to terminal 100 when the expected maximum propagation delay time between base station 300 and terminal 100 or the CP length of the Preamble part is longer than the CP length (i.e., the threshold) of another uplink channel (e.g., PUSCH or SRS). For example, when terminal 100 receives the indication of stopping the transmission of the Data part signal, terminal 100 transmits the Preamble part signal and does not transmit the Data part signal in the msg A signal.

Further, RACH resource controller 302 may indicate the application of (i.e., falling back to) the 4-step random access, for example, to terminal 100 to which the transmission stop of the Data part in msg A is indicated.

This prevents the ICI from RACH to another uplink channel.

Figure 14:
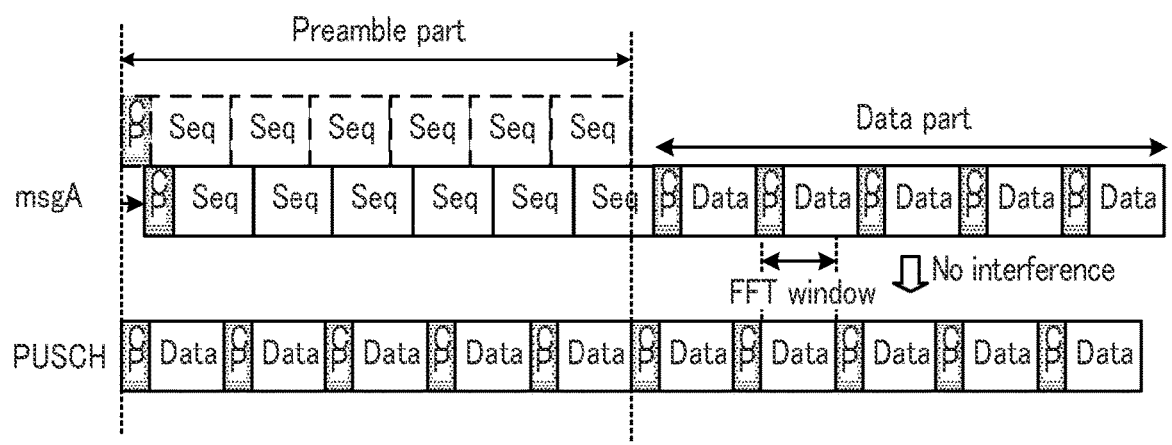
FIG. 14 illustrates another exemplary Slot format according to Embodiment 2.

Meanwhile, RACH resource controller 302 indicates the transmission of the Data part signal to terminal 100 when the CP length of the Preamble part is equal to or shorter than the CP length (i.e., the threshold) of another uplink channel. In this case, for example, the Data part signals of different OFDM symbols are not mingled in the FFT window of PUSCH as illustrated in FIG. 14, thereby securing the continuity of the signals at both ends of the FFT window of PUSCH and causing no ICI from RACH to PUSCH.

[CP Length Control for Data Part]

RACH resource controller 302 may control the CP length of the Data part according to the CP length of the Preamble part (i.e., the estimation result of the propagation delay time) in order to prevent the interference (ICI) from RACH to another uplink channel (e.g., PUSCH).

For example, RACH resource controller 302 configures the CP length of the Data part to the same value as the CP length of PUSCH when the CP length of the Preamble part (corresponding to the expected maximum propagation delay amount, for example) is equal to or less than the CP length (i.e., the threshold) of PUSCH. In this case, for example, neither the Preamble part nor the Data part interferes with PUSCH as illustrated in FIG. 14.

Meanwhile, RACH resource controller 302 configures the CP length of the Data part to be long when the CP length of the Preamble part is longer than the CP length (i.e., the threshold) of PUSCH, in order to prevent the interference from occurring. That is, when the CP length (or the propagation delay time) of the Preamble part is greater than the threshold, the CP length of the Data part is longer than the CP length of the Data part when the CP length of the Preamble part is equal to or less than the threshold.

Figure 15:
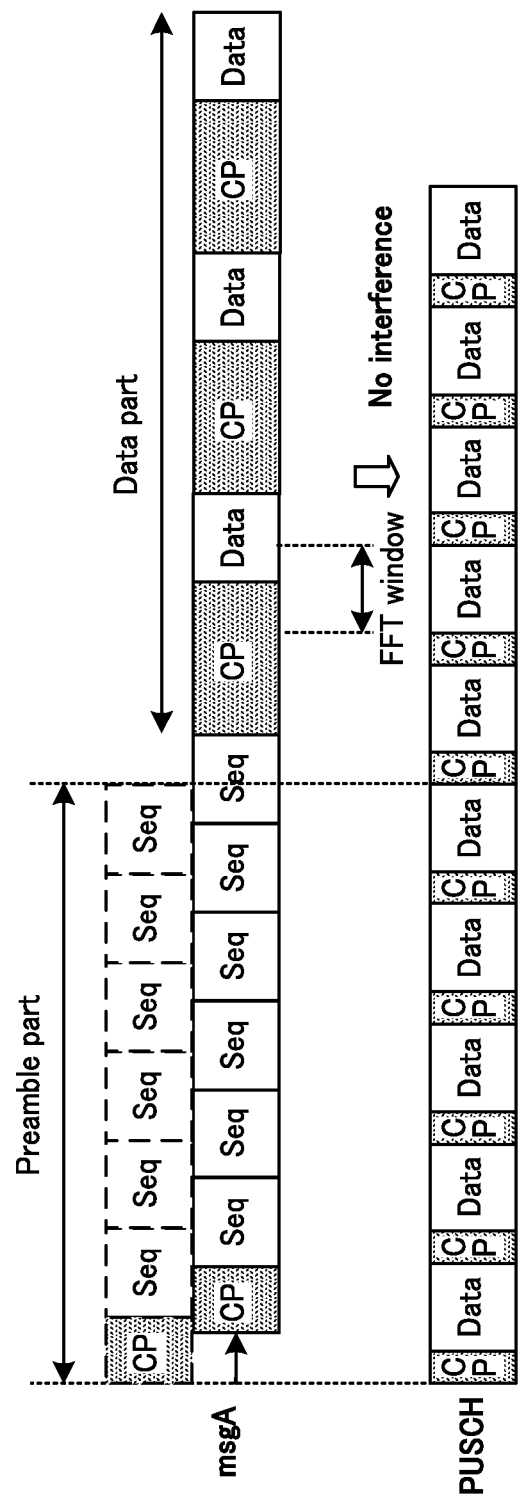
FIG. 15 illustrates still another exemplary Slot format according to Embodiment 2.

For example, as illustrated in FIG. 15, terminal 100 uses either the odd-numbered or even-numbered OFDM symbols of the Data part as the CPs of the next OFDM symbols (i.e., the other OFDM symbols of the odd-numbered or even-numbered OFDM symbols of the Data part). As a result, the continuity of the signals is secured at both ends of the FFT window of PUSCH by CPs for either the odd-numbered or the even-numbered OFDM symbols of the Data part, thereby increasing the possibility of causing no ICI from RACH to PUSCH.

As described above, according to the present embodiment, base station 300 determines the Slot format of msg A (e.g., the configuration of the Data part in msg A) based on a parameter relating to the transmission of the RACH signals (e.g., the maximum propagation delay time or the CP length of the Preamble part). Terminal 100 transmits the msg A signal with the Slot format determined based on the parameter relating to the transmission of the RACH signals (e.g., the maximum propagation delay time or the CP length of the Preamble part).

Thus, the present embodiment makes it possible to reduce the interference (ICI) from RACH to another uplink channel (e.g., PUSCH) even when RACH and another uplink channel are assigned to adjacent frequency resources, for example. Therefore, terminal 100 and base station 300 can appropriately perform the random access processing according to the present embodiment.

Note that, although PUSCH is used as an example of uplink channels other than RACH in FIGS. 13, 14, and 15, the example of other uplink channels is not limited to PUSCH and may include another uplink channel (e.g., Physical Uplink Control Channel (PUCCH)).

Each embodiment of the present disclosure has been described, thus far.

Figure 16:
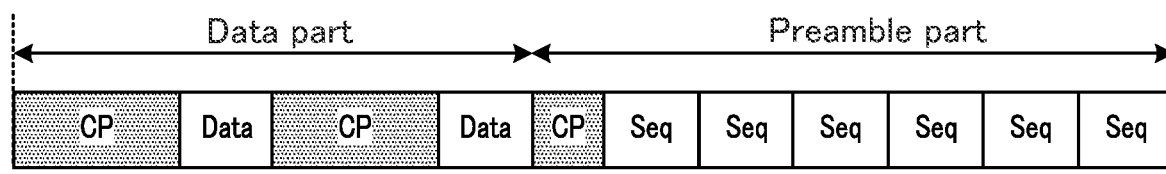
FIG. 16 illustrates an exemplary Slot format according to another embodiment.

Other Embodiments (1) The methods in Embodiments 1 and 2 may be combined. For example, as illustrated in FIG. 16, all (or a part) of the Data part in msg A may be transmitted prior to the Preamble part, as in Embodiment 1. In addition, as illustrated in FIG. 16, the CP length of the Data part may be changed in accordance with the CP length of the Preamble part, as in Embodiment 2.

(2) In the above embodiments, msg A, which is a signal for the 2-step random access, has been described. Signals to which an embodiment of the present disclosure is applied are, however, not limited to msg A, and may be, for example, other signals to be transmitted from terminal 100 (corresponding to a transmission apparatus) to base station 200 (corresponding to a reception apparatus), or transmission signals to be transmitted from base station 200 (corresponding to the transmission apparatus) to terminal 100 (corresponding to the reception apparatus).

For example, the Preamble part may be replaced with SRS, and the Data part may be replaced with PUSCH. In this case, the above embodiments may be applied to Slot formats of the SRS and the PUSCH when the SRS and the PUSCH are transmitted in the same Slot.

Other embodiments have been described, thus far.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples."

A transmission apparatus according to an embodiment of the present disclosure includes: control circuitry, which, in operation, configures a format of a random access signal including a preamble section and a data section, based on a parameter relating to transmission of the random access signal; and transmission circuitry, which, in operation, transmits the random access signal based on the format.

In the transmission apparatus according to an embodiment of the present disclosure, the format is a first format where at least a part of the data section is mapped to a position forward of the preamble section.

In the transmission apparatus according to an embodiment of the present disclosure, the control circuitry applies the first format when the random access signal is transmitted in an unlicensed band.

In the transmission apparatus according to an embodiment of the present disclosure, the control circuitry determines whether to apply the first format according to a category of carrier sensing.

In the transmission apparatus according to an embodiment of the present disclosure, the control circuitry determines whether to apply the first format according to a type of random access transmission.

In the transmission apparatus according to an embodiment of the present disclosure, the control circuitry controls a configuration of the data section in accordance with propagation delay.

In the transmission apparatus according to an embodiment of the present disclosure, the control circuitry configures non-transmission of a signal of the data section when the propagation delay is greater than a threshold.

In the transmission apparatus according to an embodiment of the present disclosure, a cyclic prefix (CP) length of the data section when the propagation delay is greater than a threshold is longer than the CP length of the data section when the propagation delay is equal to or less than the threshold.

In the transmission apparatus according to an embodiment of the present disclosure, the control circuitry configures a symbol with either an even number or an odd number in the data section for the CP of a symbol with the other number of the even number or the odd number.

In the transmission apparatus according to an embodiment of the present disclosure, the propagation delay is represented by a cyclic prefix (CP) length or a cyclic shift value of the preamble section, and the threshold is a CP length of a channel different from a random access channel.

In the transmission apparatus according to an embodiment of the present disclosure, the propagation delay is represented by a cyclic prefix (CP) length or a cyclic shift value of the preamble section, and a CP length of the data section is configured to a CP length of a channel different from a random access channel when a CP length of the preamble section is equal to or less than a threshold.

A reception apparatus according to an embodiment of the present disclosure includes: control circuitry, which, in operation, configures a format of a random access signal including a preamble section and a data section, based on a parameter relating to transmission of the random access signal; and reception circuitry, which, in operation, receives the random access signal based on the format.

A transmission method according to an embodiment of the present disclosure includes: configuring a format of a random access signal including a preamble section and a data section, based on a parameter relating to transmission of the random access signal; and transmitting the random access signal based on the format.

A reception method according to an embodiment of the present disclosure includes: configuring a format of a random access signal including a preamble section and a data section, based on a parameter relating to transmission of the random access signal; and receiving the random access signal based on the format.

The disclosure of Japanese Patent Application No. 2018-247266, filed Dec. 28, 2018 including the specification, drawings, and abstract, is incorporated herein by reference in its entirety.

INDUSTRIAL APPLICABILITY

One embodiment of the present disclosure is useful in mobile communication systems.

REFERENCE SIGNS LIST

100 Terminal
101, 205 Antenna
102, 206 Radio receiver
103 Demodulator/decoder
104 RACH resource determiner
105 Preamble generator
106 Data generator
107 Multiplexer
108, 203 LBT
109, 204 Radio transmitter
200, 300 Base station
201, 302 RACH resource controller
202 Control information generator
207 Demultiplexer
208 Preamble detector
209 Data demodulator/decoder
301 Propagation delay estimator

The invention claimed is:

1. A transmission apparatus, comprising;
control circuitry, which, in operation, configures a format of a random access signal including a preamble section and a data section, based on a parameter relating to transmission of the random access signal, wherein the format is a first format in which at least a part of the data section is mapped, within the random access signal, to a position immediately preceding the preamble section; and
transmission circuitry, which, in operation, transmits the random access signal based on the format, wherein the data section and the preamble section are time-multiplexed within the random access signal.

2. The transmission apparatus according to claim 1, wherein the control circuitry applies the first format when the random access signal is transmitted in an unlicensed band.

3. The transmission apparatus according to claim 1, wherein the control circuitry determines whether to apply the first format according to a category of carrier sensing.

4. The transmission apparatus according to claim 1, wherein the control circuitry determines whether to apply the first format according to a type of random access transmission.

5. The transmission apparatus according to claim 1, wherein the control circuitry controls a configuration of the data section in accordance with propagation delay.

6. The transmission apparatus according to claim 5, wherein the control circuitry configures non-transmission of a signal of the data section when the propagation delay is greater than a threshold.

7. The transmission apparatus according to claim 6, wherein
the propagation delay is represented by a cyclic prefix (CP) length or a cyclic shift value of the preamble section, and
the threshold is a CP length of a channel different from a random access channel.

8. The transmission apparatus according to claim 5, wherein a cyclic prefix (CP) length of the data section when the propagation delay is greater than a threshold is longer than the CP length of the data section when the propagation delay is equal to or less than the threshold.

9. The transmission apparatus according to claim 8, wherein the control circuitry configures a symbol with either an even number or an odd number in the data section for the CP of a symbol with the other number of the even number or the odd number.

10. The transmission apparatus according to claim 5, wherein
the propagation delay is represented by a cyclic prefix (CP) length or a cyclic shift value of the preamble section, and
a CP length of the data section is configured to a CP length of a channel different from a random access channel when a CP length of the preamble section is equal to or less than a threshold.

11. A reception apparatus, comprising;
control circuitry, which, in operation, configures a format of a random access signal including a preamble section and a data section, based on a parameter relating to transmission of the random access signal, wherein the format is a first format in which at least a part of the data section is mapped, within the random access signal, to a position immediately preceding the preamble section; and
reception circuitry, which, in operation, receives the random access signal based on the format, wherein the data section and the preamble section are time-multiplexed within the random access signal.

12. A transmission method, comprising:
configuring a format of a random access signal including a preamble section and a data section, based on a parameter relating to transmission of the random access signal, wherein the format is a first format in which at least a part of the data section is mapped, within the random access signal, to a position immediately preceding the preamble section; and
transmitting the random access signal based on the format, wherein the data section and the preamble section are time-multiplexed within the random access signal.

13. A reception method, comprising:
configuring a format of a random access signal including a preamble section and a data section, based on a parameter relating to transmission of the random access signal, wherein the format is a first format in which at least a part of the data section is mapped, within the random access signal, to a position immediately preceding the preamble section; and
receiving the random access signal based on the format, wherein the data section and the preamble section are time-multiplexed within the random access signal.

* * * * *